United States Patent
Yoshida et al.

(10) Patent No.: US 7,603,297 B2
(45) Date of Patent: Oct. 13, 2009

(54) INVENTORY MANAGEMENT METHOD, SYSTEM AND PROGRAM

(75) Inventors: Tomoyuki Yoshida, Chuo-ku (JP); Yoshihisa Fujii, Chuo-ku (JP); Genichiro Iguchi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 841 days.

(21) Appl. No.: 10/529,490

(22) PCT Filed: Oct. 7, 2003

(86) PCT No.: PCT/JP03/12845
§ 371 (c)(1), (2), (4) Date: Aug. 19, 2005

(87) PCT Pub. No.: WO2004/033349
PCT Pub. Date: Apr. 22, 2004

(65) Prior Publication Data
US 2006/0085291 A1    Apr. 20, 2006

(30) Foreign Application Priority Data
Oct. 11, 2002    (JP) ............................ 2002-298410

(51) Int. Cl.
*G06Q 1/14* (2006.01)
*G06Q 10/00* (2006.01)
*G06F 19/00* (2006.01)

(52) U.S. Cl. ............................ 705/28; 705/22; 235/385

(58) Field of Classification Search ........................ None
See application file for complete search history.

(56) References Cited
U.S. PATENT DOCUMENTS
2004/0059649 A1 *  3/2004  Sakuma et al. ................. 705/28
2006/0026072 A1 *  2/2006  Suguro ........................ 705/16

FOREIGN PATENT DOCUMENTS

| JP | A-07-192068 | 7/1995 |
| JP | A-08-190593 | 7/1996 |
| JP | A-11-039410 | 2/1999 |

(Continued)

OTHER PUBLICATIONS

Yozo Iida; "Tanki Logistics Keikaku Sakutei Shien System, Keiei no Kagaku Operations Research"; The Operations Research Society of Japan; vol. 42, No. 5: pp. 355-358; May 1, 1997.
William J. Stevenson; *Production Operations Management*; International Edition; 6th Edition; pp. 566-595; 1999.

*Primary Examiner*—F. Zeender
*Assistant Examiner*—Fahd A Obeid
(74) *Attorney, Agent, or Firm*—Oliff & Berridge, PLC

(57) ABSTRACT

An inventory management method or system for controlling amounts of stocks is provided. The method comprises the steps of: storing delivery times and quantities of order lots accepted and restock lead times predetermined every item in a storage; selecting at least one order lot accepted, having a delivery time within a period from "b" days before to "a" days after a basic time, from said order lots accepted, to set a threshold value $x+y\sigma_1$ (where $y \geqq 0$) based upon both an average x and a standard deviation $\sigma_1$ of quantities of said selected order lot accepted; classifying at least one order lot accepted having a quantity $\alpha$ of the selected order lot accepted as a normal accepted order lot, wherein the $\alpha$ is less than or equal to said threshold value and classifying at least one order lot accepted having a quantity $\alpha$ of the selected order lot accepted as a special accepted order lot, wherein the $\alpha$ is greater than said threshold value; and calculating a basic stock using a predetermined formula from said classified normal order lot accepted.

18 Claims, 3 Drawing Sheets

FOREIGN PATENT DOCUMENTS

| | | |
|---|---|---|
| JP | A-11-345267 | 12/1999 |
| JP | A-2000-172768 | 6/2000 |
| JP | A-2000-229711 | 8/2000 |
| JP | A-2002-236730 | 8/2002 |

* cited by examiner

INVENTORY MANAGEMENT METHOD, SYSTEM AND PROGRAM

BACKGROUND OF THE INVENTION

1. Field of the Invention

The present invention relates to an inventory management method, system and program for controlling amount of stock.

2. Related Art Statements

Approaches for management of inventory are divided broadly into a fixed quantity ordering system and a fixed interval ordering system, and they are well known. The fixed quantity ordering system is a system for ordering a certain quantity of a product when a stock falls below a criteria quantity. The fixed interval ordering system is a system for ordering only shortfall in a quantity being sufficient to the basic stock, periodically (e.g., each month end or each weekend).

The basic stock, which is the basics of inventory management, is derived from a possibility shipping quantity for a period from an ordering point to a time at which items are supplied (i.e. during a restock lead time) and a safety stock, which is to compensate a difference between an actual shipping quantity and the possibility shipping quantity when the actual shipping quantity during the lead time is greater than the possibility shipping quantity. In a manufacturing and logistics department, order quantities and production volumes are adjusted so that stocks can be closed to the basic stocks to coincide with them. Making more stocks improves on time delivery rates, that is we can more flexibly respond to orders or demands. On the other hand excess stocks would decrease stock turnover rates to increase inventory costs. Thus in order to increase the stock turnover rates the basic inventories must be minimized to a certain extent that the on time delivery rates slightly decline.

Consequently, some systems for effectively managing inventories have been developed. For instance, an inventory management system has been developed, this system comprises a means for simulating basic stocks based upon past anticipated requirements, actual shipments, and feature requirements plans, and means for determine how to order or selecting one of ordering systems based upon the simulation results (refer to a publication: Japanese Patent Laid Open No. 7-192068).

Conventional inventory management systems determine basic stocks based upon receipts of orders on receiving the orders. For example, in the above mentioned conventional inventory management system, when a larger quantity order having a delivery time in long term is accepted, this large quantity order's information is incorporated into a set of samples to calculate an inventory, so that this information has an great impact on a basic stock. However, a large quantity in a bulk order more considerably than an average order quantity rarely appears. If temporary information such as the bulk order is incorporated into the set of the samples to determine the basic stock, excessive working stocks are held. Thus inventory costs are raised and the inventory cannot be effectively controlled. It is an object of the present invention to provide a system, method and program for utilizing statistical techniques to effectively derive inventory information.

SUMMARY OF THE INVENTION

In order to solve the above mentioned problems, an inventory management method for controlling amounts of stocks is provided, the method comprises the steps of:

storing delivery times and quantities of order lots accepted (order data) and restock lead times predetermined every item in a storage(inventory database);

selecting at least one order lot accepted, having a delivery time within a period from "b" days before to "a" days after a basic time, from said order lots accepted, to set a threshold value $x+y\sigma_1$ (where $y \geq 0$) based upon both an average x and a standard deviation $\sigma_1$ of quantities of said selected order lot(s) accepted;

classifying at least one order lot accepted having a quantity $\alpha$ of the selected order lot(s) accepted as a normal accepted order lot(s), wherein the $\alpha$ is less than or equal to said threshold value and classifying at least one order lot accepted having a quantity $\alpha$ of the selected order lot(s) accepted as a special accepted order lot(s), wherein the $\alpha$ is greater than said threshold value; and calculating a basic stock using a predetermined formula from said classified normal order lot(s) accepted.

In an embodiment of the present invention, an inventory management method for controlling amounts of stocks is provided, the method comprises the steps of:

storing delivery times and quantities of order lots accepted and restock lead times predetermined every item in a storage;

selecting at least one order lot accepted, having a delivery time within a period from "b" days before a basic time to the basic time, from said order lots accepted, to set a threshold value $x_1+y_1\sigma_2$ (where $y_1 \geq 0$) based upon both an average $x_1$ and a standard deviation $\sigma_2$ of quantities of said selected order lot(s) accepted, and selecting at least one order lot accepted, having a delivery time within a period from the basic time to "a" days after the basic time, from said ordered lots, to set a threshold value $x_2+y_2\sigma_3$ (where $y_2 \geq 0$) based upon both an average $x_2$ and a standard deviation $\sigma_3$ of quantities of said selected order lot(s) accepted;

classifying at least one order lot accepted having a quantity "B", being less than or equal to said threshold value $(x_1+y_1\sigma_2)$ (i.e. $B \leq x_1+y_1\sigma_2$), of the selected order lot(s) accepted, having a delivery time before the basic time, as a normal ordered lot(s) accepted, and classifying at least one order lot accepted having a quantity "A", being less than or equal to said threshold value $(x_2+y_2\sigma_3)$ (i.e. $A \leq x_2+y_2\sigma_3$), of the selected order lot(s) accepted, having a delivery time after the basic time, as the normal ordered lot(s) accepted; and calculating a basic stock using a predetermined formula from said classified normal ordered lot(s) accepted.

In another embodiment of the method according to the present invention, said calculating a basic inventory step comprises:

calculating an order point "r" and the basic stock $\beta$ using following equations:

$$r = cz + m\sigma_4\sqrt{c}$$

$$\beta = r + tz$$

where z signifies an average shipping quantity per day of an order lot, having a delivery time within a period from the basic time to "a" days after, of said normal order lot(s) accepted, c represents the restock lead time, t is an order differential time delay, m is equal to or greater than 1 and influences an on time delivery rate, $\sigma 4$ signifies a standard deviation of shipping quantities per day of an ordered lots, having a delivery time within a period from "b" days before to the basic time, of said normal ordered lots;

when $d+e \leq r$, where d signifies a present amount of an stock and e represents a quantities on order, calculating a required order quantity "f" using an equation $f = \beta - (d+e-cz)$ to setup it.

According to the present invention, as described above there are provided the steps of setting the threshold value related to the received order lots based upon statistical data of a quantity every order lot accepted using appropriate data processing means and eliminating samples (i.e. order lots) having a quantity greater than the threshold value, from a set of samples, which are used to calculate the basic stock and the ordering point, thereby the basic inventory and the ordering point can properly be set with meeting needs of customers (i.e. keeping appropriately on-time delivery rates). Thus stocks and its costs can be successfully reduced. In more specifically, since almost accepted order lots having a large quantity (i.e. the special accepted order lots) have specified delivery time long afterward, the specified days of such special accepted orders can be addressed without including them into the set of samples. Thus even if these special accepted orders are excluded from the set of samples for calculating the stocks management factors as described above, there are substantially no possibilities to affect the on-time delivery rates.

In addition, the predetermined formula can be one or more equation of any known equations used for managing inventories, it is preferable to use the equations in the step of calculating an order point and the basic stock described above.

In the present method according to the invention, the ordering point and basic stock are derived from the set of samples including only the normal accepted order lots, which set is prepared by the steps of selecting one or more order lots accepted, having a delivery time within a period from "b" days before to "a" days after a basic time/day, from all of order lots accepted and classifying one or more order lot accepted having a quantity $\alpha$ of the selected order lot(s) accepted as a normal accepted order lot(s), wherein the $\alpha$ is less than or equal to said threshold value.

In addition, the normal accepted order lots can be prepared as following steps: selecting one or more order lots accepted, having a delivery time within a period from "b" days before a basic time/day to the basic time and one or more order lots accepted, having a delivery time within a period from the basic time to "a" days after the basic time, from all of the order lots accepted to set two threshold values separately based upon the two sets of samples (order lots); and classifying one or more order lots having a quantity equal to or less than the criteria as the normal accepted order lots. In this way, the set of normal accepted order lots can precisely be collected by providing respective threshold values for the respective two sets of samples.

In one embodiment of the present invention, the basic time is a reference time to determine the basic stock $\beta$. In general current date is used as the basic time. The lower the values "a" and "b", the more recent numerical data of accepted order lots is reflected to the basic stock. In the same time, if too low values are used, the sets of samples for calculation will be small and thus reliability as fundamental data for calculating the basic stock $\beta$ is reduced. Accordingly the values "a" and "b" are preferably set to appropriate ranges as described later.

Here, the basic stock $\beta$ is mainly derived from the ordering point "r", which ordering point "r" is a total of adding a safe stock and a possibility shipping quantity during a restock lead time. The possibility shipping quantity during a restock lead time is an anticipated shipping quantity during the restock time (i.e. from an ordering point for requesting items to a production division to a time in which products are arrived at a logistics section). In one embodiment of the method according to the present invention, the possibility shipping quantity is derived from one or more order lots, having a delivery time within a period from the basic time (i.e. current time) to "a" days after the basic time, selected from the normal accepted order lots.

The safety stock is used, when actual quantities of accepted orders during the lead time is greater than a possibility shipping quantity, to compensate a difference between them. In one embodiment of the method according to the present invention, the safety stock is derived from one or more order lots, having a delivery time within a period from "b" days before the basic time to the basic the basic time, selected from the normal accepted order lots. When the number of future days "a" is less than the number of past days "b", the buffer stock and the basic stock are determined separately, that is an working stock (i.e. the basic stock) is determined based upon recent future orders accepted, at the same time the safety stock is determined based upon past orders accepted in sufficiently long days. We have actually applied an inventory management system according to the present invention to a live system. As a result, we found that it is preferable to set the "a" and "b" as follows:

$$a:b=1:1.5-3.$$

In addition we found that it is preferable to set "a" as follows:

$$5 \text{ days} \leq a \leq 60 \text{ days}.$$

As described above, in one embodiment of the method according to the present invention, since the safety stock are calculated from the accepted orders for past "b" days, corresponding to actual shipments and the anticipated shipment quantity is calculated from the accepted orders for future "a" days, the most suitable basic stock can be set by reflecting past actual performance into the basic stock and reading future trends.

In another embodiment of the method according to the present invention, the method further comprise the steps of: setting an alarm criteria range based upon said basic stock $\beta$; monitoring a total of shipping quantities for future "c" days (i.e. in a period from a basic alarm time to "c" days after the basic alarm time); and issuing an warning to an operator(s) when the total is beyond the alarm criteria range.

According to the present invention, when the setup value of the basic stock cannot accommodate actual shipment quantities an warning is issued to an operator. Accordingly the operator or a person in charge of stock management can manually reset the basic stock based upon the actual accepted orders or some inventory management factors without missing the opportunity. In this connection, this basic alarm time can be set to a time, at which the alarm criteria range or the basic stock is set, or a time a few days before current time.

In regard to the alarm criteria range, it is preferable to set both upper and lower limits. However, either only upper limit or only lower limit may be set. For instance, the warning criteria range can be set to a plus or minus 20% of the basic stock.

The means for warning used in the method according to the present invention is not restricted. For example, one embodiment of an inventory management system can display an warning message on a CRT of the system, or send an e-mail or a short-message including an warning message to a PC, PDA or mobile phone of the person in charge. In addition, the alarm criteria range of the method can be reset periodically such as daily or weekly. It is preferable to issue an warning on detecting that the quantity is beyond the said range in the monitoring step. However, the packed warning having some warning messages can be issued on weekly or monthly basis.

In still another embodiment of the method according to the present invention, the method further comprises the steps of: recalculating the basic stock and ordering point, when the warning is issued or any one of data which are related to inventory calculation is updated using this update as a trigger; recalculating the basic stock and ordering point in a predetermined period of time; and replacing the current setup values of the basic stock and the ordering point by the recalculated basic stock and ordering point. Thereby, the basic stock and the ordering point can automatically and timely be reset to the newly calculated appropriate values.

By way of easily explanation the aspect of the present invention has been mainly described as methods, however it is understood that the present invention may be realized as systems i.e. devices corresponding to the methods, programs embodying the methods as well as a storage media storing the programs.

For example, according to another aspect of the present invention, an inventory management system for controlling amounts of stocks is provided, the system comprises:

storing means for storing delivery times and quantities of order lots accepted and restock lead times predetermined every item therein;

selecting means for selecting at least one order lot accepted, having a delivery time within a period from "b" days before to "a" days after a basic time, from said order lots accepted, to set a threshold value $x+y\sigma_1$ (where y is equal to or more than 0) based upon both an average x and a standard deviation $\sigma_1$ of quantities of said selected order lot(s) accepted;

classifying means for selecting at least one order lot accepted having a quantity α of the selected order lot(s) accepted as a normal accepted order lot(s), wherein the α is less than or equal to said threshold value; and calculating means for calculating a basic stock using a predetermined formula from said classified normal accepted order lot(s).

For example, according to another aspect of the present invention, a program for executing an inventory management method for controlling amounts of stocks is provided, said program comprises the steps of:

storing delivery times and quantities of order lots accepted and restock lead times predetermined every item in a storage;

selecting at least one order lot accepted, having a delivery time within a period from "b" days before to "a" days after a basic time, from said order lots accepted, to set a threshold value $x+y\sigma_1$ (where y is equal to or more than 0) based upon both an average x and a standard deviation $\sigma_1$ of quantities of said selected order lot(s) accepted;

classifying at least one order lot accepted having a quantity α of the selected order lot(s) accepted as a normal accepted order lot(s), wherein the α is less than or equal to said threshold value; and calculating a basic stock using a predetermined formula from said classified normal accepted order lot(s).

DETAILED DESCRIPTION OF THE PREFERRED EMBODIMENTS

Several preferred embodiments of the inventory management systems according to the present invention will be described with reference to the accompanying drawings.

Figure 1:
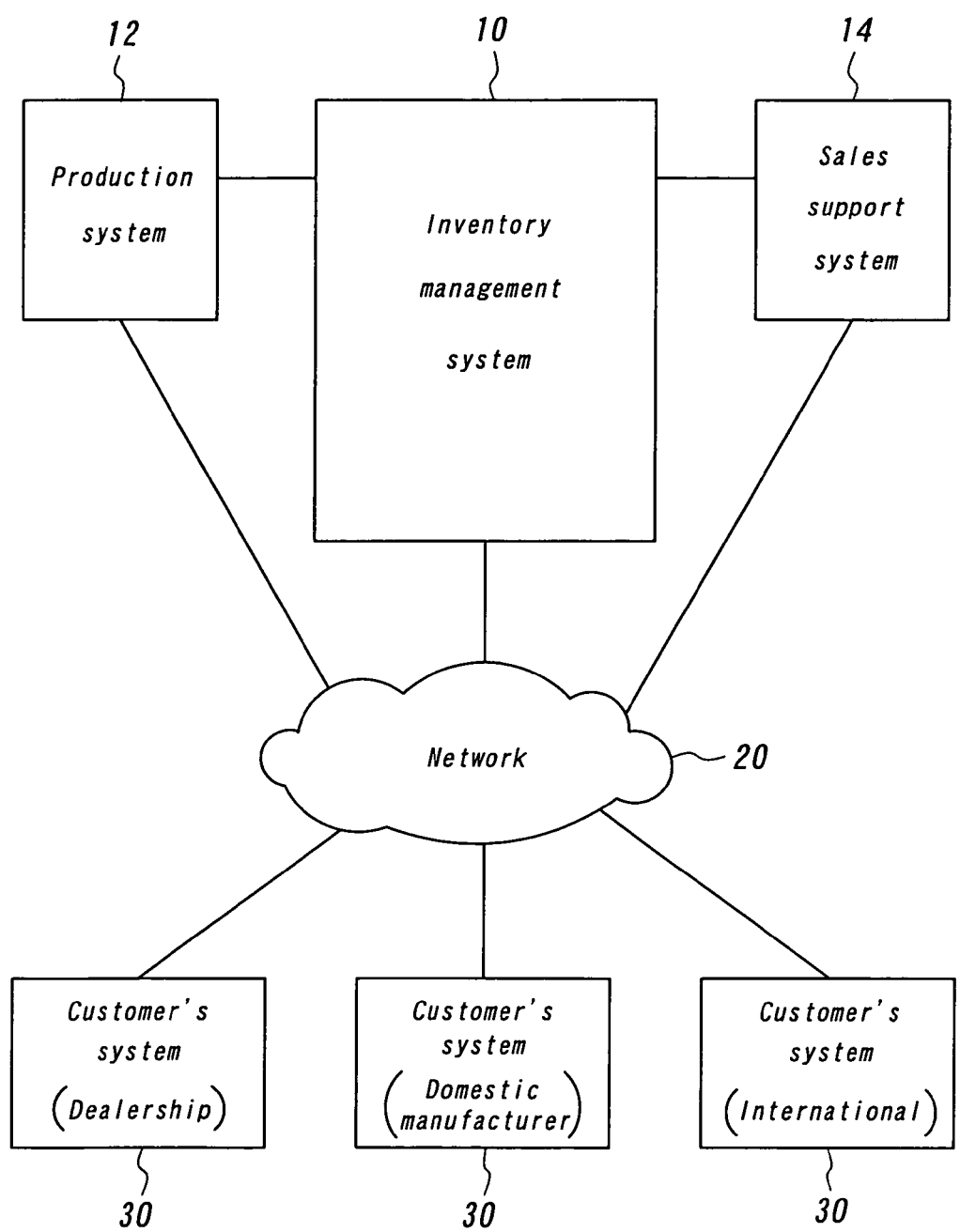
FIG. 1 is a block diagram illustrating an environment use with an embodiment of the inventory management system according to the present invention.

FIG. 1 is a block diagram illustrating an environment use with an embodiment of the inventory management system according to the present invention. As shown in FIG. 1, an inventory management system 10 is connected to a production system 12 and a sales support system 14 via a network such as an Intranet (not shown) or a network 20 (e.g., the Internet). The inventory management system 10 receives data relating to factory stocks and operation situations from the production system 12. On detecting a condition that a quantity of a stock reaches to a calculated reordering point, the inventory management system 10 transmits order data to the production system 12. The inventory system 10 receives order accepted data (e.g., temporally reserved data, reserved data, or inquiry data, etc.) from the sale support system 14 and sends inventory data to the sale support system 14.

In addition, the above described inventory management system 10, the production system 12, and the sales support system 14 are further connected to a plurality of customer's systems 30 via the network 20, respectively. The sales support system 14 receives some pieces of accepted order data, which are accepted at the each of customers, from these customer's systems and processes the received data to forward the inventory management system 10.

Figure 2:
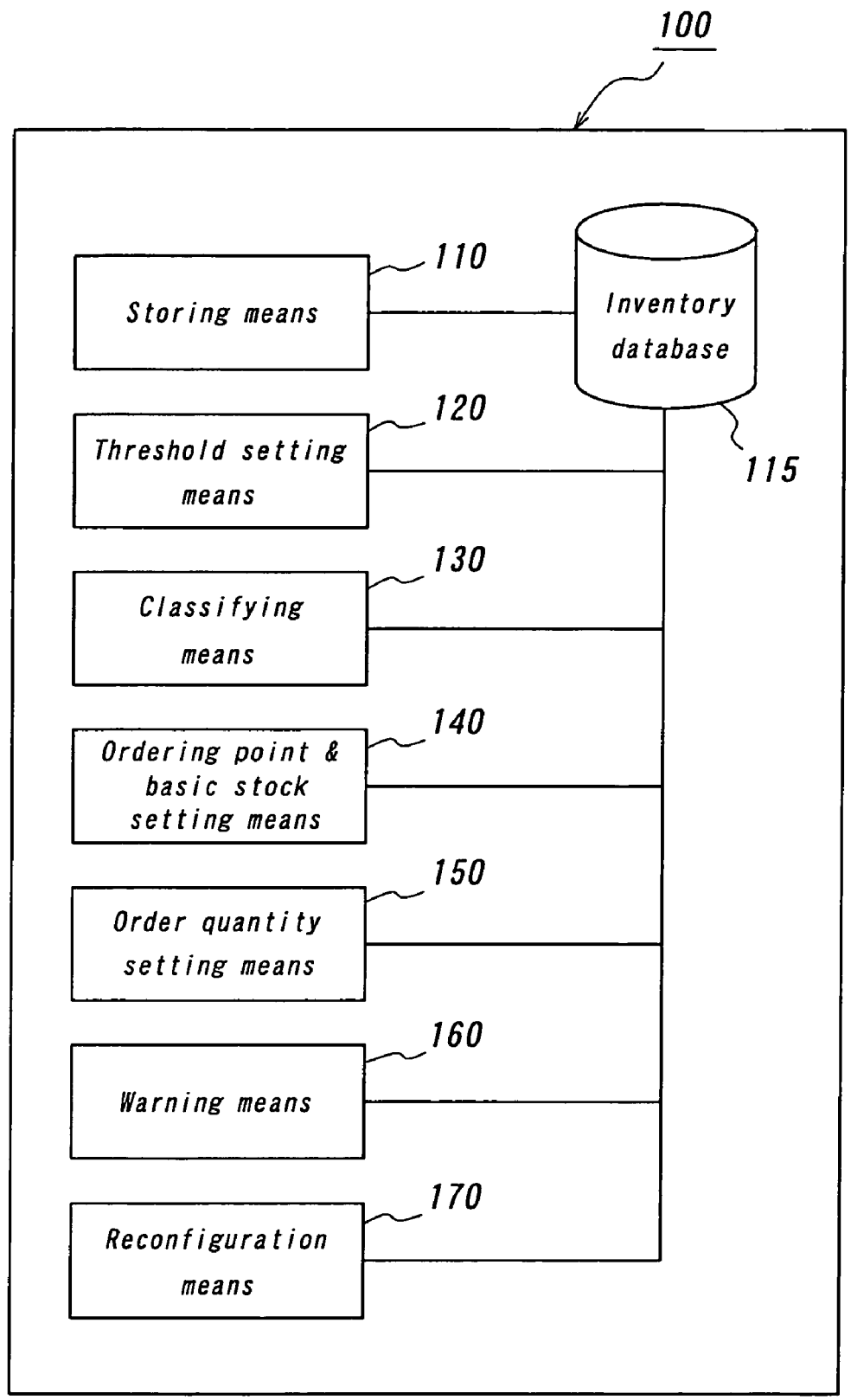
FIG. 2 is a block diagram showing a basic configuration of an embodiment of the inventory management system according to the present invention.

FIG. 2 is a block diagram showing a basic configuration of an embodiment of the inventory management system according to the present invention. As shown in FIG. 2, an inventory management system 100 comprises a storing means 110, an inventory database 115, a threshold setting means 120, a classifying means 130, an ordering point and basic stock setting means 140, an order quantity setting means 150, a warning means 160, and a reconfiguration means 170. The present system 100 comprises input means such as a keyboard, display means such as a CRT or an LCD, and external interfaces (which are not shown). The storing means 110 stores delivery times and quantities of order lots accepted and restock lead times predetermined every item, which are received from the sales support system or the production system, in the inventory database 115 (i.e. a storage). This inventory management database is used for storing data regarding the inventory management such as ordering points and basic stocks, as will be described in detail later.

The threshold setting means 120 selects any order lots accepted, having a delivery time within a period from "b" days before to "a" days after a current time, from the all of order lots accepted, and calculates and sets a threshold value $x+y\sigma_1$ (where y is equal to or more than 0) based upon both an average x and a standard deviation $\sigma_1$ of quantities of said selected order lots accepted. The calculated values are stored in the inventory management database 115. It is preferable to recalculate the threshold value to replace the setup threshold value with the newly calculated value, in a predetermined period or an arbitrary point of time.

The classifying means 130 classifies any order lots accepted having a quantity α, which is less than or equal to said threshold value, of the selected order lots accepted as normal accepted order lots. The classifying means 130 also classifies any order lots accepted having a quantity α, which is greater than said threshold value, of the selected order lots accepted as special accepted order lots. The classified lots and calculated results are stored in the database 115.

Alternatively, the normal accepted order lots can be provided as follows. The threshold setting means 120 selects any order lots accepted, having a delivery time within a period from "b" days before a current time to the current time (i.e. for past "b" days), from said all of order lots accepted, and calculates and sets a threshold value $x_1+y_1\sigma_2$ (where $y_1$ is equal to or more than 0) based upon both an average $x_1$ and a standard deviation $\sigma_2$ of quantities of said selected order lots accepted, and selects any order lots accepted, having a delivery time within a period from the current time to "a" days after the current time (i.e. for future "a" days), from said all of ordered lots, and calculates and set a threshold value $x_2+y_2\sigma_3$ (where $y_2$ is equal to or more than 0) based upon both an average $x_2$ and a standard deviation $\sigma_3$ of quantities of said selected order lot(s) accepted. The calculated values are stored in the inventory management database 115.

The classifying means 130 classifies any order lots accepted having a quantity "B", being less than or equal to said threshold value $(x_1+y_1\sigma_2)$, of the selected order lot(s) accepted, having a delivery time within a period from "b" days before the current time to the current time (i.e. for past "b" days), as a normal accepted order lot(s), and classifies any order lots accepted having a quantity "A", being less than or equal to said threshold value $(x_2+y_2\sigma_3)$, of the selected order lots accepted, having a delivery time within a period from the current time to "a" days after the current time (i.e. for future "a" days), as the normal accepted order lots. The classified lots and calculation results are stored in the database 115.

The ordering point and basic stock setting means 140 calculates and sets an order point "r" and the basic stock a using following equations:

$$r = cz + m\sigma_4\sqrt{c}$$

$$\beta = r + tz$$

where z signifies an average shipping quantity per day of an order lot, having a delivery time within a period from the current time to "a" days after the current time, of said normal accepted order lots, c represents the restock lead time, t is an order differential time delay, m is an factor and equal to or greater than 1, $\sigma 4$ signifies a standard deviation of shipping quantities per day of order lots accepted, having a delivery time within a period from "b" days before the current time to the current time, of said normal accepted order lots. The calculated results are also stored in the database 115.

The order quantity setting means 150, when $d+e \leq r$, where d signifies a present amount of an stock and e represents a quantities on order, calculates and sets a required order quantity "f" using an equation $f=\beta-(d+e-cz)$. The calculated results are also stored in the database 115.

The warning means 160 sets an alarm criteria range based upon said basic stock $\beta$, monitors a total of shipping quantities in a period from a basic alarm time to "c" days after the basic alarm time, and issues, on detecting a condition that the total is beyond the alarm criteria range, an warning to an operator.

The reconfiguration means 170 recalculates said basic stock and/or said order point to reconfigure them using newly current stock information, on detecting one of conditions: the warning is issued, any data regarding the inventory management is changed, or a predetermined cycle comes (e.g., each month end or each weekend comes).

The inventory management system according to the invention may further comprises receiving means for receiving accepted order data (e.g., an accepted lot number, an order attribute (definite reserved, temporary reserved, or inquiry phase, etc.), a customer number, item numbers, specified delivery dates, or quantities, etc.) from other server system such as the sales support system, the present system updates the inventory management database using the received data. In addition, the inventory management system may further comprise ordering means for transmitting order data to other server such as the production system when a quantity of the stock is reached to the ordering point. Here, the term "lot" is a unit of measure for trading such that a quantity of one-order corresponds to 1 lot. For instance, when an order of quantity of 1 million capacitors is accepted, a set of the one million capacitors is referred to as "1 lot".

y, $y_1$, and $y_2$ used for the calculation of the threshold values are coefficients for adjusting (i.e., increasing or decreasing). If in order to include samples (accepted order lots) having a certain quantity not frequently accepted into a set of samples used for calculating a basic stock, the value of y should be increased. If, the value of y is decreased, an adverse condition is provided. For example, when y=0, the value of the threshold is a just average of quantities per accepted order lot and a quantity of an accepted order lot is within the threshold value with probability 50%. Furthermore, if y=1 the probability is 84.13%, if y=2 it is 97.72%, and if y=3 it is 99.87%.

In addition above described coefficient m is referred to as a "safety factor". As the value of the coefficient m is increased, service levels (i.e. on-time delivery rates) are also improved. Thus rapid changes of the shipment or order condition can properly be addressed. However, in this case, safety stocks are increased and thus inventory costs will be higher. Accordingly, the coefficient m is preferably determined in response to desired service levels.

The order differential time delay "t", which is used for calculation of basic stocks $\beta$, is for calculating basic stocks with taking account of an anticipated differential delay time (days) in preparation the case that reordered items are stocked with a time delay of a few days from due date (i.e. restock lead time). In other words, by introducing this order differential time delay "t", although the restock lead time should essentially be fixed, if a delivery of reordered items is delayed, the restock lead time can substantially be changed to handle the difference (i.e. delay days).

When an warning is issued by the present inventory management system, following steps are done. Firstly, an alarm criteria range is determined based upon a basic stock. For example, the range can be set to a plus or minus 20% of the basic stock.

Then, using a basic alarm time instead of the basic time for calculating of the basic stock, a possibility or anticipated shipping quantity "cz" during the lead time is obtained and the obtained "cz" is compared with the warning criteria. Here, the threshold is calculated from quantities of accepted order lots having a delivery day within a period from "b" days before to "a" days after the basic alarm time. In other words, accepted order lots having a quantity beyond the threshold are excluded from a set of samples for calculating "z".

Consequently, when the value of cz is within the warning criteria an alarm is issued, when value of cz is not within the warning criteria an alarm is issued. The basic alarm time can arbitrarily be altered such as daily or every three days.

When a basic stock adjustment means (reconfiguration means) is provided, in order to adjust/recalculate the basic stock following steps are done. When an alarm is issued, using this alarm as a trigger for starting parameter reconfiguration, the basic stock is newly calculated using the basic alarm time as a basic time of basic stocks and the newly calculated basic stock is set as a current setting value in the present inventory system. Accordingly, the set of samples for reconfiguration the basic stock when the warning is issued includes accepted order lots having a delivery time within a period of "b" days before to "a" days after the basic alarm time.

Procedure of the reconfiguration of the order point is basically similar to the above described steps. In addition, reconfiguration/recalculation of the basic stock and order point may be initiated based upon the number of warning times. For example, if on detecting the condition that warning is issued repeatedly (such as three consecutive times in a certain time of period), the reconfiguration of these parameters may be initiated.

Figure 3:
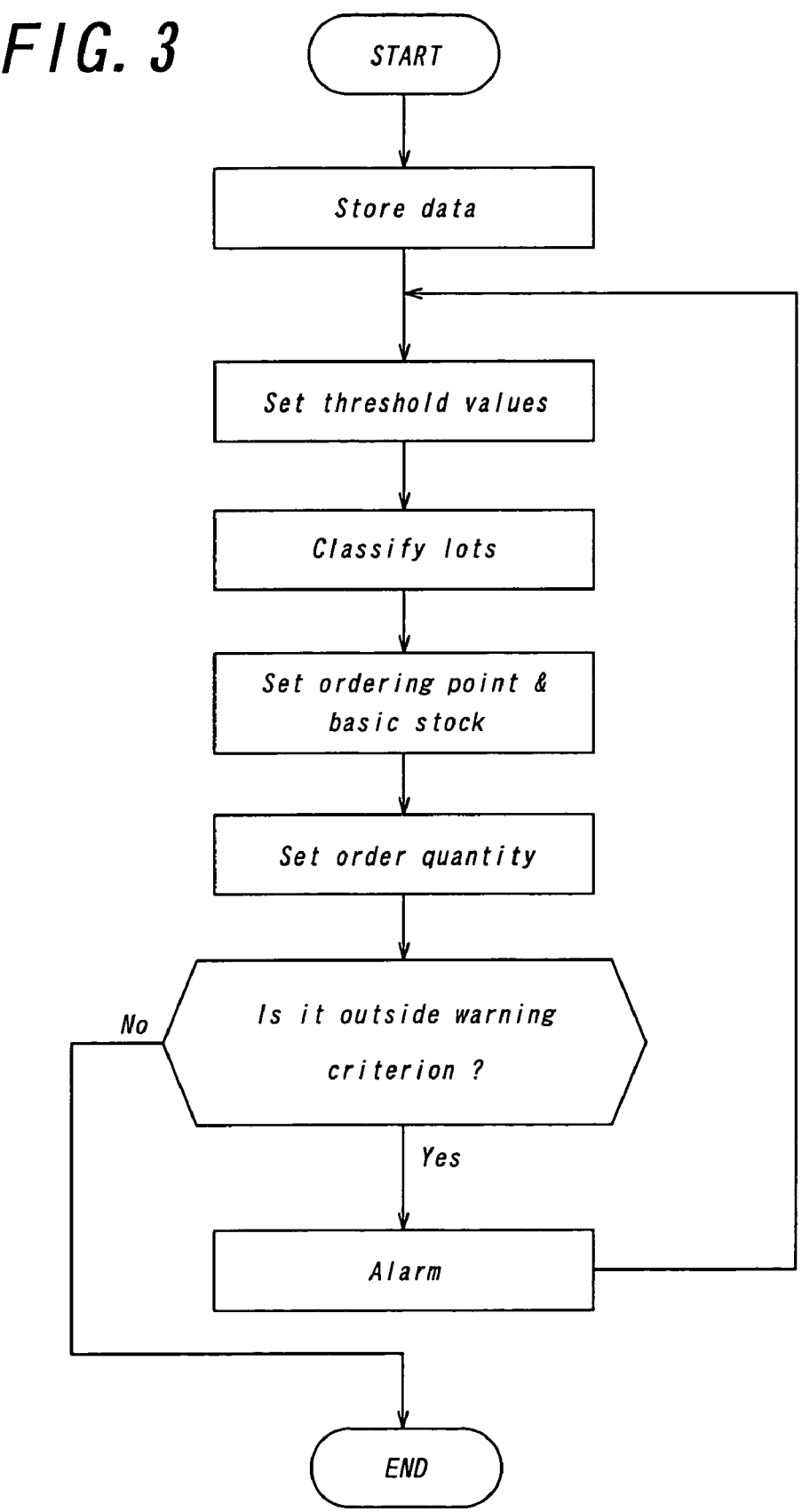
FIG. 3 is a flow diagram depicting exemplary processing performed by the inventory management system according to the present invention.

The above described operations performed by the inventory management system according to the present invention are illustrated as a flowchart in FIG. 3. In the drawing, each of the illustrated process boxes can be relocated anywhere if not logically contradictory. For example, a determination box (step) in the drawing may be relocated to any place below a box that the basic stock is calculated. In addition in this drawing, although control after the determination box is returned to a threshold setting box (step), the control can be returned to other box (step).

In addition, in practically sense data relating the inventory management is received/transmitted periodically, intermittently or on a case-by-case basis and the basic stock and ordering point are respectively recalculated based upon change of the data every change or on a predetermined period.

According to the present invention, since the basic stocks is calculated from a set of samples including only "the normal accepted order lots" except "the special accepted order lots", the basic stocks can be decreased to appropriate values without decreasing on time delivery rates. In other words, inventory costs can effectively be reduced without decreasing customer satisfaction. Furthermore, stock turnover rates can also be reduced by reducing the basic stocks. In addition, the warning means of the present invention prompts a person in charge to adjust the stocks timely and thereby the inventory management can more properly be achieved.

We have actually applied an inventory management system according to the present invention to a live system, as a result the basic stocks were reduced. Furthermore, an average turnover rate was increased to 2.1 times from 0.5 times in the conventional inventory management system. That is the turnover rate was remarkably improved and in the same time the stock costs were also drastically reduced. Furthermore, regardless of that the basic stocks were reduced, the on-time delivery rates were kept to substantially same as the that of the conventional inventory management system. While the present invention has been described with respect to some embodiments and drawings, it is to be understood that the present invention is not limited to the above-described embodiments, and modifications and drawings, various changes and modifications may be made therein, and all such changes and modifications are considered to fall within the scope of the invention as defined by the appended claims.

What is claimed is:

1. A computer implemented inventory management method for controlling amounts of stocks, the method comprising the steps of:

storing, in a memory, delivery times and quantities of order lots accepted and restock lead times predetermined for every item;

selecting, with a controller, at least one order lot accepted, having a delivery time within a period from "b" days before to "a" days after a basic time, from said order lots accepted, to set a threshold value $x+y\sigma_1$ (where y is equal to or more than 0) based upon both an average x and a standard deviation $\sigma_1$ of quantities of said selected order lot(s) accepted;

classifying, with the controller, at least one order lot accepted having a quantity $\alpha$ of the selected order lot(s) accepted as a normal accepted order lot(s), wherein the $\alpha$ is less than or equal to said threshold value; and calculating, with the controller, a basic stock using a predetermined formula from said classified normal accepted order lot(s), wherein said calculating the basic stock using the predetermined formula comprises:

calculating an order point "r" and the basic stock $\beta$ using following equations:

$$r = cz + m\sigma_4\sqrt{c}$$

$$\beta = r + tz$$

where "z" signifies an average shipping quantity per day of an order lot, having a delivery time within a period from the basic time to "a" days after, of said normal accepted order lot(s), "c" represents the restock lead time, "t" is an order differential time delay, "m" is equal to or greater than 1, $\sigma_4$ signifies a standard deviation of shipping quantities per day of order lots accepted, having a delivery time within a period from "b" days before to the basic time, of said normal accepted order lot(s);

when $d+e \leq r$, where "d" signifies a present amount of a stock and "e" represents a quantities on order, calculating a required order quantity "f" using an equation $f = \beta - (d+e-cz)$.

2. A computer implemented inventory management method for controlling amounts of stocks, the method comprising the steps of:

storing, in a memory, delivery times and quantities of order lots accepted and restock lead times predetermined for every item;

selecting, with a controller, at least one order lot accepted, having a delivery time within a period from "b" days before a basic time to the basic time, from said order lots accepted, to set a threshold value $x_1+y_1\sigma_2$ (where $y_1$ is equal to or more than 0) based upon both an average $x_1$ and a standard deviation $\sigma_2$ of quantities of said selected order lot(s) accepted, and selecting at least one order lot accepted, having a delivery time within a period from the basic time to "a" days after the basic time, from said ordered lots, to set a threshold value $x_2+y_2\sigma_3$ (where $y_2$ is equal to or more than 0) based upon both an average $x_2$ and a standard deviation $\sigma_3$ of quantities of said selected order lot(s) accepted;

classifying, with the controller, at least one order lot accepted having a quantity "B", being less than or equal to said threshold value ($x_1+y_1\sigma_2$), of the selected order lot(s) accepted, having a delivery time before the basic time, as a normal accepted order lot(s), and classifying at least one order lot accepted having a quantity "A", being less than or equal to said threshold value ($x_2+y_2\sigma_3$), of the selected order lot(s) accepted, having a delivery time after the basic time, as the normal accepted order lot(s); and calculating, with a controller, a basic stock using a predetermined formula from said classified normal accepted order lot(s), wherein said calculating the basic stock using the predetermined formula comprises:

calculating an order point "r" and the basic stock β using following equations:

$$r = cz + m\sigma_4\sqrt{c}$$

$$\beta = r + tz$$

where "z" signifies an average shipping quantity per day of an order lot, having a delivery time within a period from the basic time to "a" days after, of said normal accepted order lot(s), "c" represents the restock lead time, "t" is an order differential time delay, "m" is equal to or greater than 1, $\sigma_4$ signifies a standard deviation of shipping quantities per day of order lots accepted, having a delivery time within a period from "b" days before to the basic time, of said normal accepted order lot(s);

when $d+e \leq r$, where "d" signifies a present amount of a stock and "e" represents a quantities on order, calculating a required order quantity "f" using an equation $f = \beta - (d+e-cz)$.

3. The computer implemented method according to claim 1, wherein a relationship between said a and b is a:b=1:1.5-3.

4. The computer implemented method according to claim 1, wherein said "a" is in a range as follows: 5 days $\leq a \leq 60$ days.

5. The computer implemented method according to claim 1, further comprising the step of:
setting an alarm criteria range based upon said basic stock β, and monitoring a total of shipping quantities in a period from a basic alarm time to "c" days after the basic alarm time, when the total is beyond the alarm criteria range issuing a warning.

6. The computer implemented method according to claim 5, further comprising the steps of:
setting an alarm criteria range based upon said basic stock β, and monitoring a total of shipping quantities in a period from a basic alarm time to "c" days after the basic alarm time, when the total is beyond the alarm criteria range issuing a warning; and
recalculating, when the warning is issued, and said basic stock and/or said order point to reconfigure them.

7. An inventory management system for controlling amounts of stocks, comprising:
storing means for storing delivery times and quantities of order lots accepted and restock lead times predetermined for every item therein;
selecting means for selecting at least one order lot accepted, having a delivery time within a period from "b" days before to "a" days after a basic time, from said order lots accepted, to a set a threshold value $x + y\sigma_1$ (where y is equal to or more than 0) based upon an average x and a standard deviation of $\sigma_1$ of quanties of said selected order lot(s) accepted;
classifying means for selecting at least one order lot accepted having a quantity α of the selected order lot(s) accepted as a normal accepted order lot(s), wherein the α is less than or equal to said threshold value; and
calculating means for calculating a basic stock using a predetermined formula from said classified normal accepted order lot(s),
wherein said calculating means for calculating the basic stock using the predetermined formula comprises:
calculation means for calculating an order point "r" and the basic stock β using following equations:

$$r = cz + m\sigma_4\sqrt{c}$$

$$\beta = r + tz$$

where "z" signifies an average shipping quantity per day of an order lot, having a delivery time within a period from the basic time to "a" days after, of said normal accepted order lot(s), "c" represents the restock lead time, "t" is an order differential time delay, "m" is equal to or greater than 1, $\sigma_4$ signifies a standard deviation of shipping quantities per day of order lots accepted, having a delivery time within a period from "b" days before to the basic time, of said normal accepted order lot(s);

when $d+e \leq r$, where "d" signifies a present amount of a stock and "e" represents a quantities on order, calculating a required order quantity "f" using an equation $f = \beta - (d+e-cz)$.

8. An inventory management system for controlling amounts of stocks, comprising:
storing means for storing delivery times and quantities of order lots accepted and restock lead times predetermined for every item therein;
selecting nmeans for selecting at lease one order lot accepted, having a delivery time within a period from "b" days before a basic time to the basic time, from said order lots accepted, to set a threshold value $x_1 + y_1\sigma_2$ (where $y_1$ is equal to or more than 0) based upon both an average $x_1$ and a standard deviation of $\sigma_2$ of quantities of said selected order lot(s) accepted, and selecting at least one order lot accepted, having a delivery time within a period from the basic time to "a" days after the basic time, from said ordered lots, to set a threshold value $x_2 + y_2\sigma_3$ (where $y_2$ is equal to or more than 0) based upon both an average $x_2$ and a standard deviation $\sigma_3$ of quantities of said selected order lot(s) accepted;
classfying means for classifying at least one order lot accepted having a quantity "B", being less than or equal to said threshold value $(x_1 + y_1\sigma_2)$, of the selected order lot(s) accepted, having delivery time before the basic time, as a normal accepted order lot(s), and classifying at least one order lot accepted having a quantity "A", being less than or equal to said threshold value $(x_2 + y_2\sigma_3)$, of the selected order lot(s) accepted, having a delivery time after the basic time, as the normal accepted order lot(s); and
calculating means for calculating a basic stock using a predetermined formula from said classified normal accepted order lot(s),
wherein said calculating means for calculating the basic stock using the predetermined formula comprises:
calculation means for calculating an order point "r" and the basic stock β using following equations:

$$r = cz + m\sigma_4\sqrt{c}$$

$$\beta = r + tz$$

where "z" signifies an average shipping quantity per day of an order lot, having a delivery time within a period from the basic time to "a" days after, of said normal accepted order lot(s), "c" represents the restock lead time, "t" is an order differential time delay, "m" is equal to or greater than 1, $\sigma_4$ signifies a standard deviation of shipping quantities per day of order lot(s) accepted, having a delivery time within a period from "b" days before to the basic time, of said normal accepted order lot(s);

when $d+e \leq r$, where "d" signifies a present amount of a stock and "e" represents a quantities on order, calculating a required order quantity "f" using an equation $f = \beta - (d=e-cz)$.

9. The system according to claim 7, wherein a relationship between said a and b is a:b=1:1.5-3.

10. The system according to claim 7, wherein said "a" is in a range as follows: 5 days $\leq a \leq 60$ days.

11. The system according to claim 7, further comprising:
warning means for setting an alarm criteria range based upon said basic stock $\beta$, and monitoring a total of shipping quantities in a period from a basic alarm time to "c" days after the basic alarm time, when the total is beyond the alarm criteria range issuing a warning.

12. The system according to claim 7, further comprising:
warning for setting an alarm criteria range based upon said basic stock $\beta$, and monitoring a total of shipping quanities in a period from a basic alarm time to "c" days after the basic alarm time, when the total is beyond the alarm criteria range issuing a warning; and
reconfiguration means for recalculating, when the warning is issued, said basic stock and/or said order point to reconfigure them.

13. A computer readable storage medium that stores a computer executable program for executing an inventory management method for controlling amounts of stocks, said program comprising the steps of:
storing delivery times and quantities of order lots accepted and restock lead times predetermined for every item in a storage;
selecting at least one order lot accepted, having a delivery time within a period from "b" days before to "a" days after a basic time, from said order lots accepted, to set a threshold value $x+y\sigma_1$ (where y is equal to or more than 0) based upon both an average x and a standard deviation $\sigma_1$ of quantities of said selected order lot(s) accepted;
classifying at least one order lot accepted having a quanity $\alpha$ of the selected order lot(s) accepted as a normal accepted order lot(s), wherein the $\alpha$ is less than or equal to said threshold value; and
calculating a basic stock using a predetermined formula from said classified normal accepted order lot(s),
wherein said calculating the basic stock using the predetermined formula comprises:
calculating an order point "r" and the basic stock $\beta$ using following equations:

$$r = cz + m\sigma_4 \sqrt{c}$$

$$62 = r + tz$$

where "z" signifies an average shipping quanity per day of an order lot, having a delivery time within a period from the basic time to "a" days after, of said normal accepted order lot(s), "c" represents the restock lead time, "t" is an order differential time delay, "m" is equal to or greater than 1, $\sigma_4$ signifies a standard deviation of shipping quantities per day of order lots accepted, having a delivery time within a period from "b" days before to the basic time, of said normal accepted order lot(s);
when $d+e \leq r$, where "d" signifies a present amount of a stock and "e" represents a quantities on order, calculating a required order quantity "f" using an equation $f = \beta - (d+e-cz)$.

14. A computer readable storage medium that stores a computer executable program for executing an inventory management method for controlling amounts of stocks, said program comprising the steps of:
storing delivery times and quantities of order lots accepted and restock lead times predetermined for every item in a storage;
selecting at lease one order lot accepted, having a delivery time within a period from "b" days before a basic time to the basic time, from said order lots accepted, to set a threshold value $x_{1+y1}\sigma_2$ (where $y_1$ is equal to or more than 0) based upon both an average $x_1$ and a standard deviation $\sigma_2$ of quantities of said selected order lot(s) accepted, and selecting at least one order lot accepted, having a delivery time within a period from the basic time to "a" days after the basic time, from said ordered lots, to set a threshold value $x_2+y_2\sigma_3$ (where $y_2$ is equal to or more than 0) based upon both an avrage $x_2$ and a standard deviation $\sigma_3$ of quantities of said selected order lot(s) accepted;
classifying at least one order lot accepted having a quantity "B", being less than or equal to said threshold value $(x_1+y_1\sigma_2)$, of the selected order lot(s) accepted, having a delivery time before the basic time, as a normal accepted order lot(s), and classifying at least one order lot accepted having a quantity "A", being less than or equal to said threshold value $(x_2+y_2\sigma_3)$, of the selected order lot(s) accepted, having a delivery time after the basic time, as the normal accepted order lot(s); and
calculating a basic stock using a predetermined formula from said classified normal accepted order lot(s),
wherein said calculating the basic stock using the predetermined formula comprises:
calculating an order point "r" and the basic stock $\beta$ using the following equations:

$$r = cz + m\sigma_4 \sqrt{c}$$

$$\beta = r + tz$$

where "z" signifies an average shipping quantity per day or an order lot, having a delivery time within a period from the basic time to "a" days after, or said normal accepted order lot(s), "c" represents the restock lead time, "t" is an order differential time delay, "m" is equal to or greater than 1, $\sigma_4$ signifies a standerd deviation of shipping quantities per day of order lots accepted, having a delivery time within a period from "b" days before to the basic time, of said normal accepted order lot(s);
when $d+e \leq r$, where "d" signifies a present amount of a stock and "e" represents a quatities on order, calculating a required order quantity "f" using an equation $f = \beta - (d+e-cz)$.

15. The computer readable storage medium that stores a computer executable program according to claim 13, wherein a relationship between said a and b is a:b=1:1.5-3.

16. The computer readable storage medium that stores a computer executable program according to claim 13, wherein said "a" is in a range as follows: 5 days $\leq a \leq 60$ days.

17. The computer readable storage medium that stores a computer executable program according th claim 13, further comprising the step of:
setting an alarm criteria range based upon said basic stock $\beta$, and monitoring a total of shipping quantities in a period from a basic alarm time to "c" days after the basic alarm time, when the total is beyond the alarm criteria range issuing a warning.

18. The computer readable storage medium that stores a computer executable program according to claim 13, further comprising the steps of:
setting an alarm criteria range based upon said basic stock $\beta$, and monitoring a total of shipping quantities in a period from a basic alarm time to "c" days after the basic alarm time, when the total is beyond the alarm criteria range issuing a warnng; and
recalculating, when the warning is issued, said basic stock and/or said order point to reconfigure them.

* * * * *